US010117285B2

(12) United States Patent
Nadella et al.

(10) Patent No.: US 10,117,285 B2
(45) Date of Patent: Oct. 30, 2018

(54) CLOUD WAN OVERLAY NETWORK

(71) Applicant: Verizon Patent and Licensing Inc., Arlington, VA (US)

(72) Inventors: Ramesh Nadella, Allen, TX (US); Chris F. Sefcik, Lucas, TX (US); Prasad Deviprasad, Cary, NC (US); Manish Srivastava, Coppell, TX (US); Sreenivasa R. Pokuri, Cary, NC (US); Raju Sharma, Raleigh, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 154 days.

(21) Appl. No.: 14/970,828

(22) Filed: Dec. 16, 2015

(65) Prior Publication Data

US 2017/0181210 A1    Jun. 22, 2017

(51) Int. Cl.
*H04W 48/16*    (2009.01)
*H04W 76/15*    (2018.01)
*H04W 76/12*    (2018.01)
*H04W 28/08*    (2009.01)
*H04L 12/713*    (2013.01)

(52) U.S. Cl.
CPC ........... *H04W 76/15* (2018.02); *H04W 48/16* (2013.01); *H04W 76/12* (2018.02); *H04L 45/586* (2013.01); *H04W 28/08* (2013.01)

(58) Field of Classification Search
None
See application file for complete search history.

(56) References Cited

U.S. PATENT DOCUMENTS

2014/0007178 A1* 1/2014 Gillum .................... G06F 21/00
726/1
2014/0052877 A1* 2/2014 Mao ...................... H04L 61/103
709/245

* cited by examiner

*Primary Examiner* — Kouroush Mohebbi

(57) ABSTRACT

A network device obtains credentials of a customer associated with multiple different cloud providers of which the customer is a subscriber, and establishes, using the credentials of the customer, a cloud wide area network (WAN) overlay network across multiple different cloud computing networks associated with the multiple different cloud providers. The network device, when establishing the cloud WAN overlay network, spins up multiple virtual routers in the cloud resources of the customer at each of the multiple different cloud computing networks, with a different one of the multiple virtual routers being spun up in each of the multiple different cloud computing networks, where each of the multiple different cloud computing networks is associated with a different one of the multiple different cloud providers, and where the multiple virtual routers route data traffic between the different cloud computing networks via the cloud WAN overlay network.

20 Claims, 15 Drawing Sheets

CLOUD WAN OVERLAY NETWORK

BACKGROUND

Cloud computing is a model of Internet-based computing where on-demand access is provided to a shared pool of computing resources by cloud computing provider customers. Typically, each cloud computing provider customer may configure the particular cloud resources allocated to them within the cloud provider network. The particular cloud resources allocated to a computing provider customer may include cloud memory storage, and virtual machines. Various different cloud computing providers are commercially available including, for example, Amazon Web Services, Microsoft Azure, Google Compute Engine, and Terremark Cloud Computing.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a cloud Wide Area Network (WAN) overlay that interconnects multiple different cloud computing networks. A customer may subscribe to multiple different cloud providers, with each cloud provider having its own cloud computing network. With the provisioning of the cloud WAN overlay, as described herein, the customer's cloud resources in the multiple different cloud computing networks may be interconnected via encrypted tunnels such that the customer's cloud resources may communicate, possibly across multiple intervening physical networks, as if the cloud computing networks are part of a single WAN. The cloud WAN overlay, therefore, enables different, incompatible cloud services to be tied together such that the customer may access and use cloud resources interchangeably across the various cloud computing networks. Provisioning of the WAN overlay may include spinning up a virtual router in the customer's cloud resources at each cloud computing network. Provisioning of the WAN overlay may further include spinning up (e.g., starting and/or running) a firewall and/or a load balancer in the customer's cloud resources at each cloud computing network. The provisioning of the WAN overlay may be performed by a central orchestration engine that obtains cloud provider access credentials from the customer, obtains cloud computing network resources information to construct a map of the customer's cloud resources, defines WAN routes based on the constructed map, and establishes encrypted tunnels between the customer's cloud resources in the multiple different cloud computing networks via the defined WAN routes.

Figure 1:
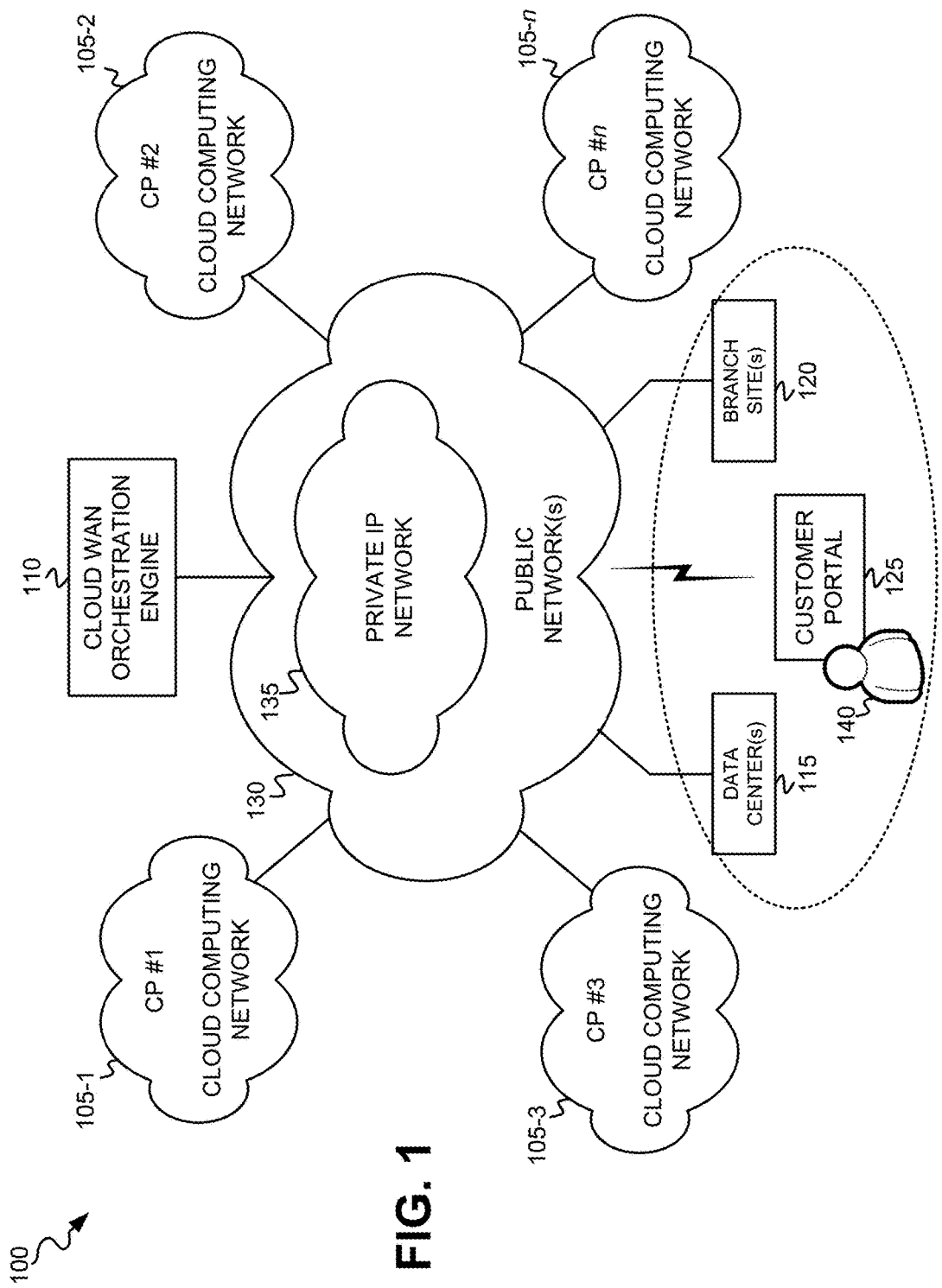
FIG. 1 illustrates an exemplary network environment in which a cloud Wide Area Network (WAN) overlay may be created to enable encrypted connectivity between a customer's cloud resources at multiple different cloud computing networks.

FIG. 1 illustrates an exemplary network environment 100 in which a cloud WAN overlay may be created to enable encrypted connectivity between a customer's cloud resources at multiple different cloud computing networks. As shown, network environment 100 includes cloud computing networks 105-1 through 105-n (generically referred to herein as "cloud computing network 105" or "cloud computing networks 105"), a cloud WAN orchestration engine 110 (referred to herein as "orchestration engine 110"), a data center(s) 115, a branch site(s) 120, a customer portal 125, a public network(s) 130, and a private Internet Protocol (IP) network 135.

Cloud computing networks 105-1 through 105-n (where n is a positive integer) may each be administrated or operated by a different cloud provider (e.g., cloud provider #1 administers cloud computing network 105-1, cloud provider #2 administers cloud computing network 105-2, etc.), to each of which a customer 140 is a subscriber. In one embodiment, the number of cloud computing networks 105 is two or more, and those cloud computing networks 105 may be connected via a cloud WAN overlay network as described herein. Each of cloud computing networks 105 may include memory storage resources (e.g., cloud memory storage resources) and processing resources (e.g., physical processing resources). A portion of the memory storage resources and/or the processing resources may be allocated to each customer that subscribes to the particular cloud computing network 105. For example, one or more virtual machines may be "spun up" for each customer in a cloud computing network to allocate a portion of the processing resources. Each cloud computing network 105, therefore, includes memory storage resources and processing resources that may be allocated to numerous different customers for on-demand usage by each of those customers.

Orchestration engine 110 may include a network device(s) that operates to establish a cloud WAN overlay network across the cloud computing networks 105 of cloud providers to which a customer subscribes. Orchestration engine 110, as described below with respect to FIGS. 7A and 7B, spins up virtual routers within customer resources at each cloud computing network 105, defines WAN routes between cloud computing networks 105 across public network(s) 130 and/or private IP network 135, establishes encrypted tunnels (e.g., Virtual Private Network (VPN) tunnels) between cloud computer networks 105 across public network(s) 130 and/or private IP network 135, and establishes forwarding tables in the virtual routers. Orchestration engine 110 may also, as described below with respect to FIGS. 7A, 7B and 12, establish encrypted tunnels (e.g., Internet Protocol Security (IPsec) tunnels) between data center(s) 115 and/or branch site(s) 120, and customer 140's cloud resources at each cloud computing network 105, establish a firewall in customer 140's cloud resources at each cloud computing network 105, and establish a load balancer at customer 140's cloud resources at each cloud computing network 105.

Data center(s) 115 may include a group of networked computer servers (i.e., network devices) used for remote storage and processing of data that is associated with customer 140. Branch site(s) 120 may include a group of networked computers, or other digital devices, that is associated with customer 140 and that communicate from the branch site(s) 120 via public network(s) 130 and/or private IP network(s) 135.

Customer portal 125 may include a device, which connects to public network(s) 130, that customer 140 may interact with to log-in to customer 140's cloud provider account(s). In one implementation, customer portal 125 may include any type of digital computing device owned or carried by customer 140 such as, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA). In another implementation, customer portal 125 may include a server (e.g., a network device) that customer 140 interacts with via an additional device owned or carried by customer 140. Customer portal 125 may execute an application (app), or a web browser that loads web pages, to display a graphical user interface that enables customer 140 to view and customize customer 140's cloud resources at each cloud computing network 105 associated with a cloud provider of which customer 140 is a subscriber.

Public network(s) 130 may include one or more networks including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, or the Internet. Public network(s) 130 may include other types of networks not explicitly described herein.

Private IP network 135 may include a privately owned and operated network that exists outside of public network(s) 130, but which connects to public network(s) 130 via one or more connection points (e.g., gateways, routers, etc. not shown in FIG. 1). Private IP network 135 may include, for example, a fiber optical cable network interconnecting switches and/or routers that forward data traffic across private IP network 135. Private IP network 135 may be owned, operated, maintained and/or administered by a same entity (e.g., company) that, for example, also owns, operates, and/or administers orchestration engine 110 and/or customer portal 125. In one implementation, private IP network 135 may employ Multiprotocol Label Switching (MPLS) for directing data units (e.g., packets, or other types of encapsulated data) across network 135.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1.

Figure 2:
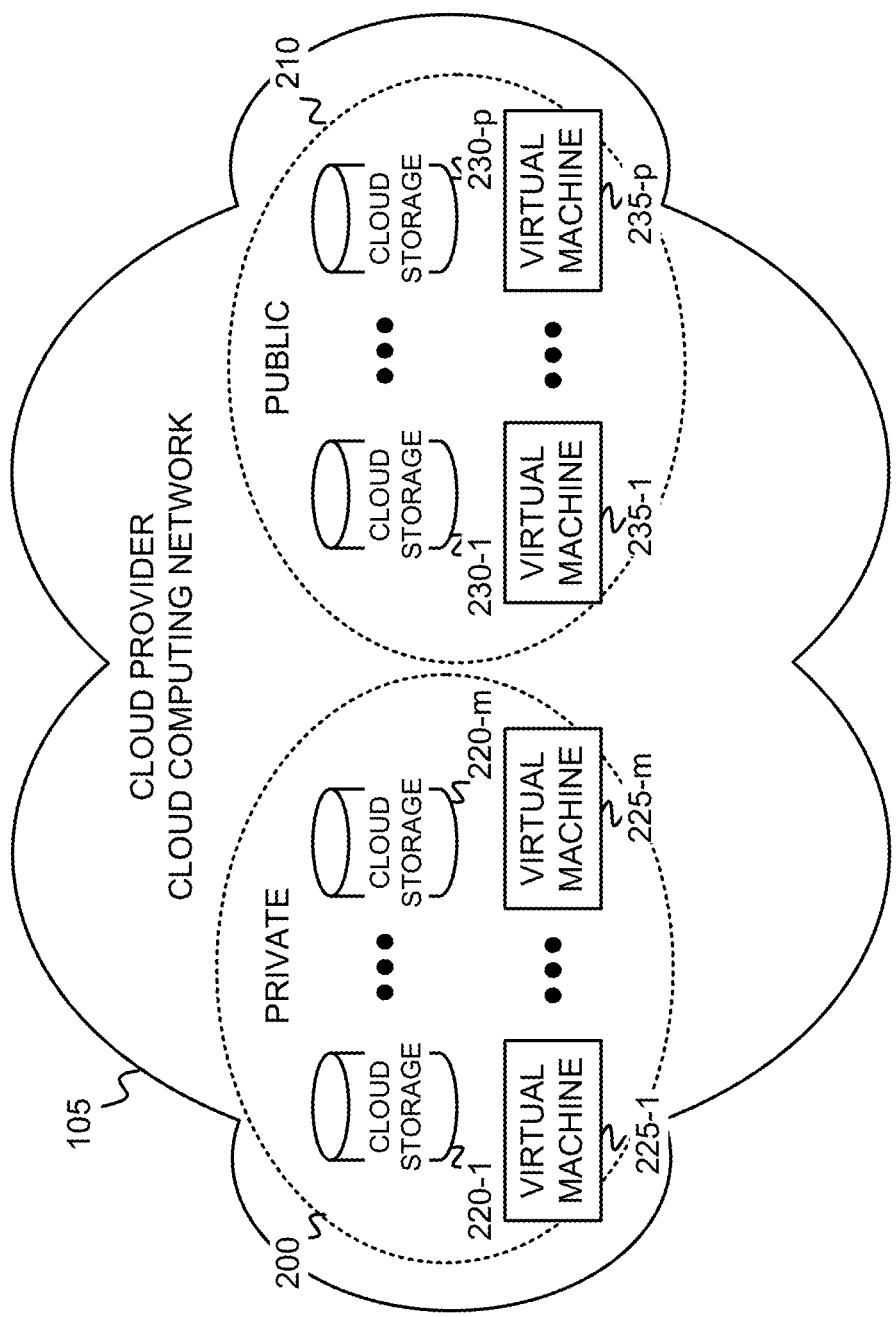
FIG. 2 depicts an example of a cloud computing network of the network environment of FIG. 1.

FIG. 2 depicts an example of a cloud computing network 105. As shown, cloud computing network 105 may include a private portion 200 and a public portion 210. Private portion 200 of cloud computing network 105 may include cloud computing resources that are not generally available for on-demand usage by customers of cloud computing network 105. Private portion 200 may include multiple cloud storage units 220-1 through 220-$m$ (generically referred to herein as "cloud storage unit 220" or "cloud storage units 220"), and multiple virtual machines (VMs) 225-1 through 225-$m$ (generically referred to herein as "VM 225" or "VMs 225"). Each cloud storage unit 220 includes one or more memory devices that store data in one or more data structures. Each of VMs 225 may include an operating system (OS) or application environment that is installed in software that imitates dedicated hardware.

Public portion 210 of cloud computing network 105 may include cloud computing resources that are available for allocation to cloud provider customers for on-demand usage. Public component 210 may include multiple cloud storage units 230-1 through 230-$p$ (generically referred to herein as "cloud storage unit 230" or "cloud storage units 230"), and multiple virtual machines (VMs) 235-1 through 235-$m$ (generically referred to herein as "VM 235" or "VMs 235"). Each cloud storage unit 230 includes one or more memory devices that store data in one or more data structures. Each of VMs 235 may include an operating system (OS) or application environment, which is installed in software to imitate dedicated hardware, and which is allocated to one or more customers. For example, VMs 235-1 and 235-2 may be allocated to customer 140, VM 235-3 may be allocated to another customer, and VMs 235-4 through 235-6 may be allocated to yet another customer.

Figure 3:
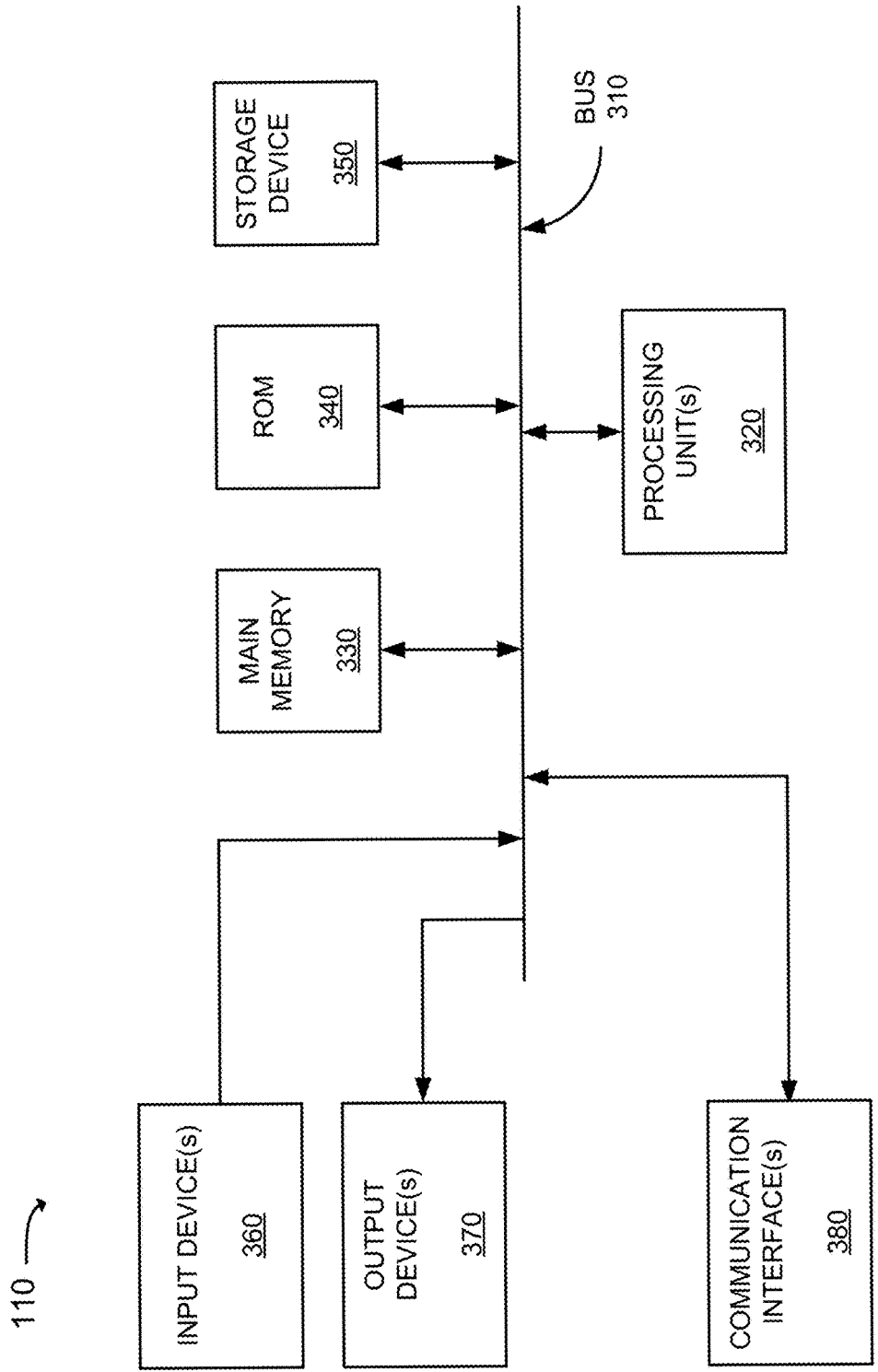
FIG. 3 depicts exemplary components of the cloud wide area network orchestration engine of FIG. 1.

FIG. 3 is a diagram that depicts exemplary components of orchestration engine 110. Each computer server of data center(s) 115, each computer or server of branch site(s) 120, the device of customer portal 125, and the physical machines implementing cloud storage units 220 or 230, or VMs 225 or 235, may each be similarly configured to orchestration engine 110 shown in FIG. 3. Orchestration engine 110 may include a bus 310, a processing unit(s) 320, a main memory 330, a read only memory (ROM) 340, a storage device 350, an input device(s) 360, an output device(s) 370, and a communication interface(s) 380. Bus 310 may includes a path that permits communication among the components of orchestration engine 110.

Processing unit(s) 320 may include one or more processors or microprocessors, or processing logic, which may interpret and execute instructions. Main memory 330 includes a random access memory (RAM) or another type of dynamic storage device that may store information and instructions for execution by processing unit(s) 320. ROM 340 includes a ROM device or another type of static storage device that may store static information and instructions for use by processing unit(s) 320. Storage device 350 includes a magnetic and/or optical recording medium. Main memory 330, ROM 340 and storage device 350 are each a "tangible and/or non-transitory computer-readable medium."

Input device 360 may include one or more mechanisms that permit an operator to input information to orchestration engine 110, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) (e.g., a touch screen display) that displays UI information and which receives user input via the UI. Communication interface(s) 380 may include one or more transceivers that enable orchestration engine 110 to communicate with other devices and/or systems. For example, communication interface(s) 380 may include wired or wireless transceivers for communicating via public network(s) 130 and/or private IP network 135.

The configuration of components of orchestration engine 110 shown in FIG. 3 is for illustrative purposes. Other configurations may be implemented. Therefore, orchestration engine 110 may include additional, fewer and/or different components, arranged in a different configuration, than depicted in FIG. 3.

Figure 4:
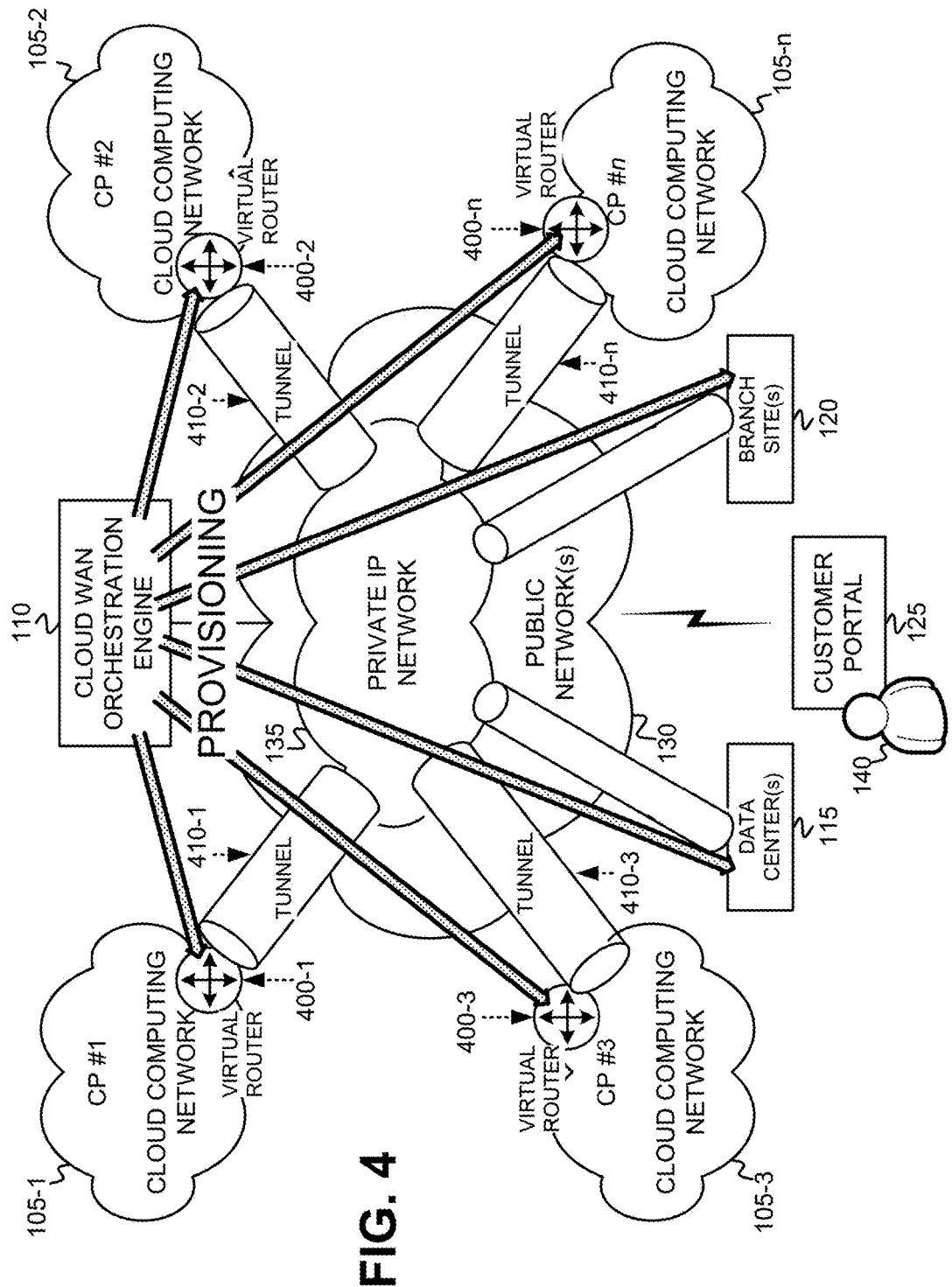
FIG. 4 depicts provisioning associated with creating a cloud WAN overlay network across one or more cloud computing networks, and one or more data center(s) and/or branch site(s) associated with a particular customer.

FIG. 4 depicts provisioning associated with creating a cloud WAN overlay network across one or more cloud computing networks 105, and one or more data center(s) 115 and/or branch site(s) associated with a particular customer 140. As shown in FIG. 4, the provisioning associated with creating a cloud WAN overlay network over the customer cloud resources of cloud computing networks 105-1 through 105-n includes spinning up a virtual router 400-1 in customer 140's cloud resources in cloud computing network 105-1, spinning up a virtual router 400-2 in customer 140's cloud resources in cloud computing network 105-2, spinning up a virtual router 400-3 in customer 140's cloud resources in cloud computing network 105-3, and spinning up a virtual router 400-n in customer 140's cloud resources in cloud computing network 105-n. Each virtual router 400-1 through 400-n may include any type of virtual router such as, for example, a Cisco CSR1000v virtual router.

As further shown in FIG. 4, the provisioning associated with creating the cloud WAN overlay network over the customer cloud resources of cloud computing networks 105-1 through 105-n also includes establishing respective encrypted tunnels 410-1 through 410-n (generically referred to herein as "encrypted tunnels 410" or "encrypted tunnel 410"), from virtual routers 400-1 through 400-n through private IP network 135 and/or public network(s) 130. Establishing encrypted tunnels 410 includes using Point-to-Point Tunneling Protocol (PPTP), Layer 2 Tunneling Protocol (L2TP), Internet Protocol Security (IPsec), or Secure Sockets Layer (SSL) for establishing an encrypted tunnel across the private network 135 and/or public network(s) 130. Each encrypted tunnel may include, for example, a Virtual Private Network (VPN) tunnel or an IPsec tunnel.

Figure 5:
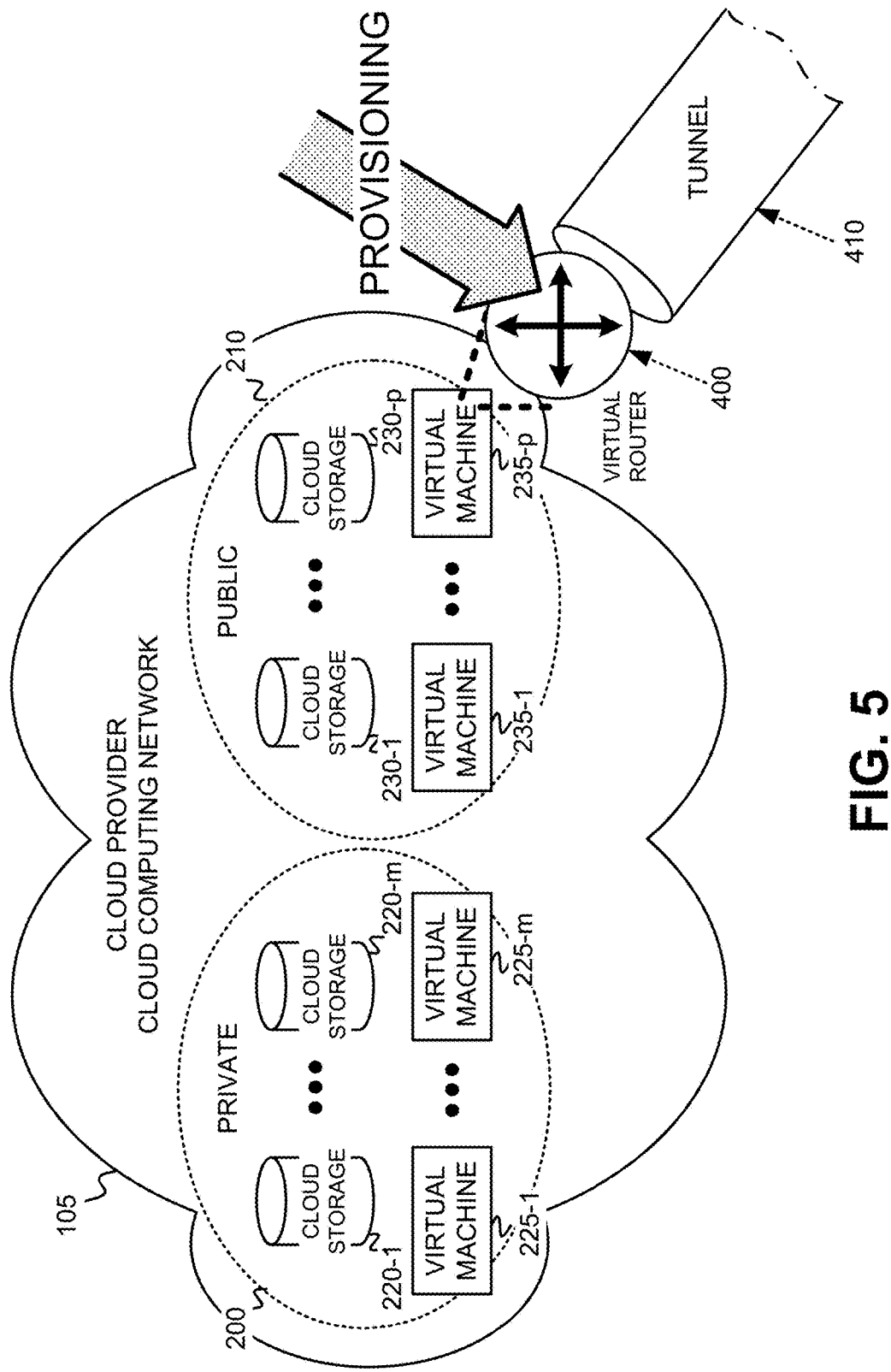
FIG. 5 depicts the provisioning of a virtual router and a Virtual Private Network tunnel, at a virtual machine in the customer cloud resources of a cloud computing network, associated with establishing the cloud WAN overlay network.

FIG. 5 depicts the provisioning of a virtual router 400 and an encrypted tunnel 410 at a virtual machine 235 in the customer 140's cloud resources of a cloud computing network 105 associated with establishing the cloud WAN overlay network. Orchestration engine 110 (not shown) causes, based on obtained information regarding customer 140's cloud resources in cloud computing network 105, virtual router 400 to be spun up within a selected virtual machine (e.g., 235-p shown in FIG. 5) of one or more virtual machines 235 allocated to customer 140. Orchestration engine 110 further establishes an encrypted tunnel 410 from virtual router 400 across private IP network 135 and/or public network(s) 130 (not shown in FIG. 5).

Figure 6:
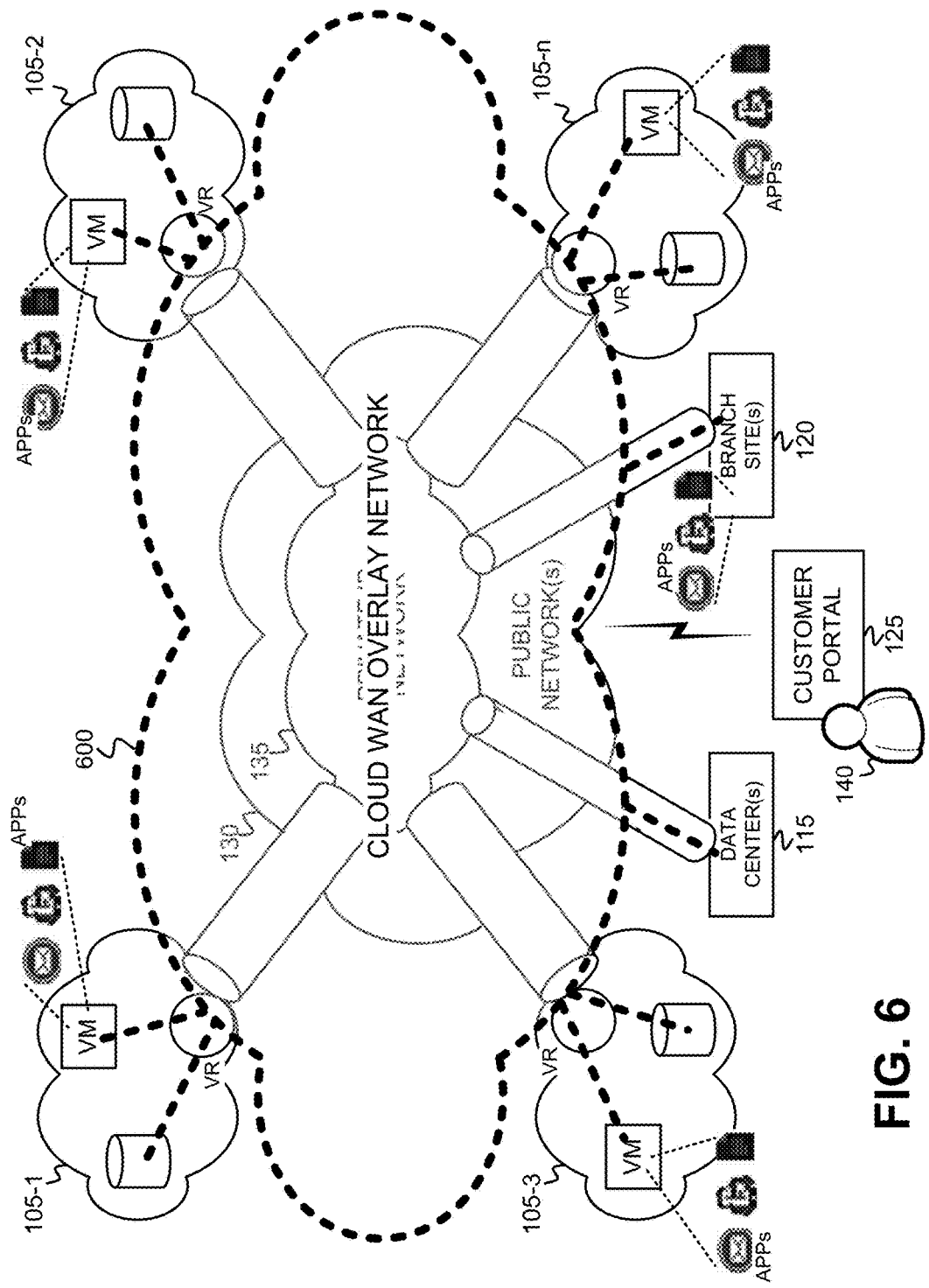
FIG. 6 is a diagram that depicts a high level view of a cloud WAN overlay network created, across one or more cloud computing networks 105, as a result of the provisioning of FIGS. 4 and 5.

FIG. 6 is a diagram that depicts a high level view of a cloud WAN overlay network 600 created, across one or more cloud computing networks 105, as a result of the provisioning of FIGS. 4 and 5. As shown, cloud WAN overlay network 600 connects customer cloud resources in each of cloud computing networks 105-1 through 105-n, data center(s) 115, and branch site(s) 120 via encrypted tunnels such that data can be exchanged between cloud computing networks, between data center(s) 115 and one or more of the cloud computing networks 105, or between branch site(s) 120 and one or more of the cloud computing networks 105, as if the data crosses a single network. Cloud WAN overlay network 600, thus, enables customer 140 to execute apps, and store and process data between multiple cloud computing networks, or between a data center(s) 115 and/or a branch site(s) 120, across multiple intervening networks (e.g., public network 130 and private IP network 135) that effectively "appear" as a single wide area network due to establishment of cloud WAN overlay network 600.

Figure 7A:
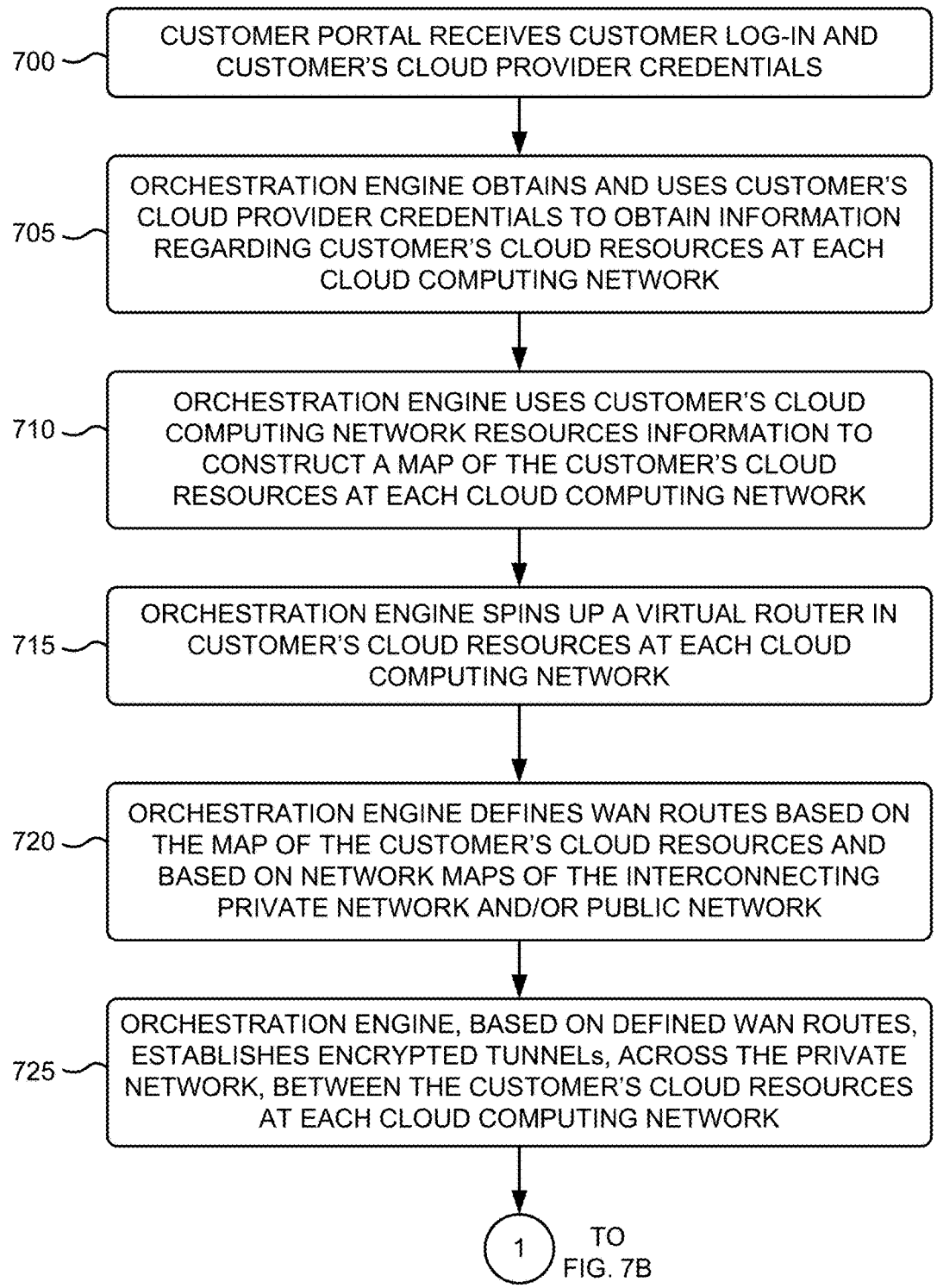
FIGS. 7A and 7B are flow diagrams that illustrate an exemplary process for provisioning a cloud WAN overlay network across one or more cloud computing networks, and one or more data center(s) and/or branch site(s) associated with a particular customer.
Figure 7B:
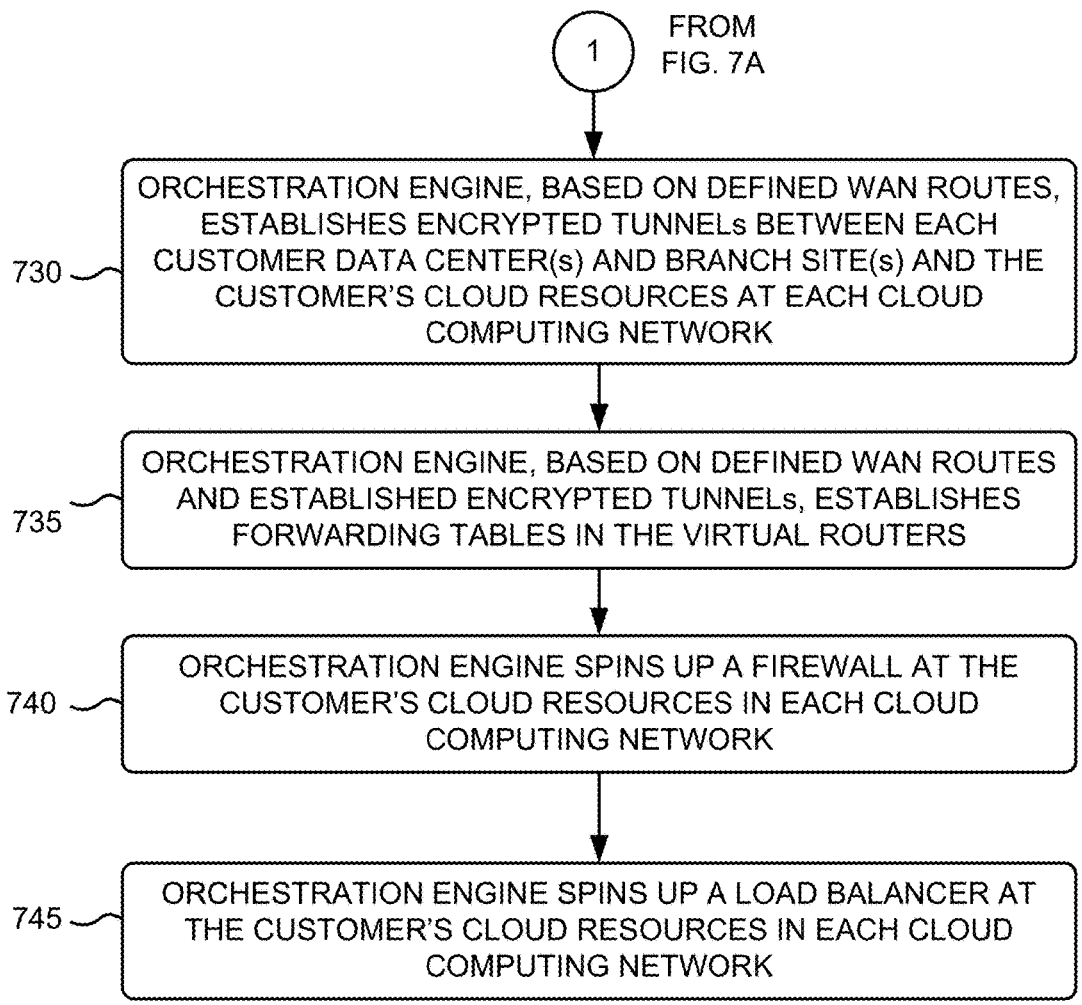

FIGS. 7A and 7B are flow diagrams that illustrate an exemplary process for provisioning a cloud WAN overlay network 600 across one or more cloud computing networks 105, and one or more data center(s) 115 and/or branch site(s) associated with a particular customer 140. The exemplary process of FIGS. 7A and 7B may be implemented by orchestration engine 110, in conjunction with customer portal 125. The exemplary process of FIGS. 7A and 7B is described below with reference to the diagrams of FIGS. 8-11.

The exemplary process may include customer portal 125 receiving a customer's log-in and the customer's cloud provider credentials (block 700). Customer portal 125, via a user interface, may permit customer 140 to input customer 140's account log-in for each cloud provider, and customer 140's credentials for each cloud provider. For example, if customer 140 has a cloud computing account with cloud provider #1, which administers cloud computing network 105-1, then customer 140 may provide, via the user interface of customer portal 125, the log-in for that cloud provider account, and any further cloud provider credentials required by that account (e.g., account password, account digital certificate or digital signature, etc.). Customer 140 may provide, via the user interface of customer portal 125, the log-in and cloud provider credentials for each cloud computing network 105 of which customer 140 is a subscriber and which customer 140 desires to interconnect via a cloud WAN overlay network, as described herein.

Figure 8:
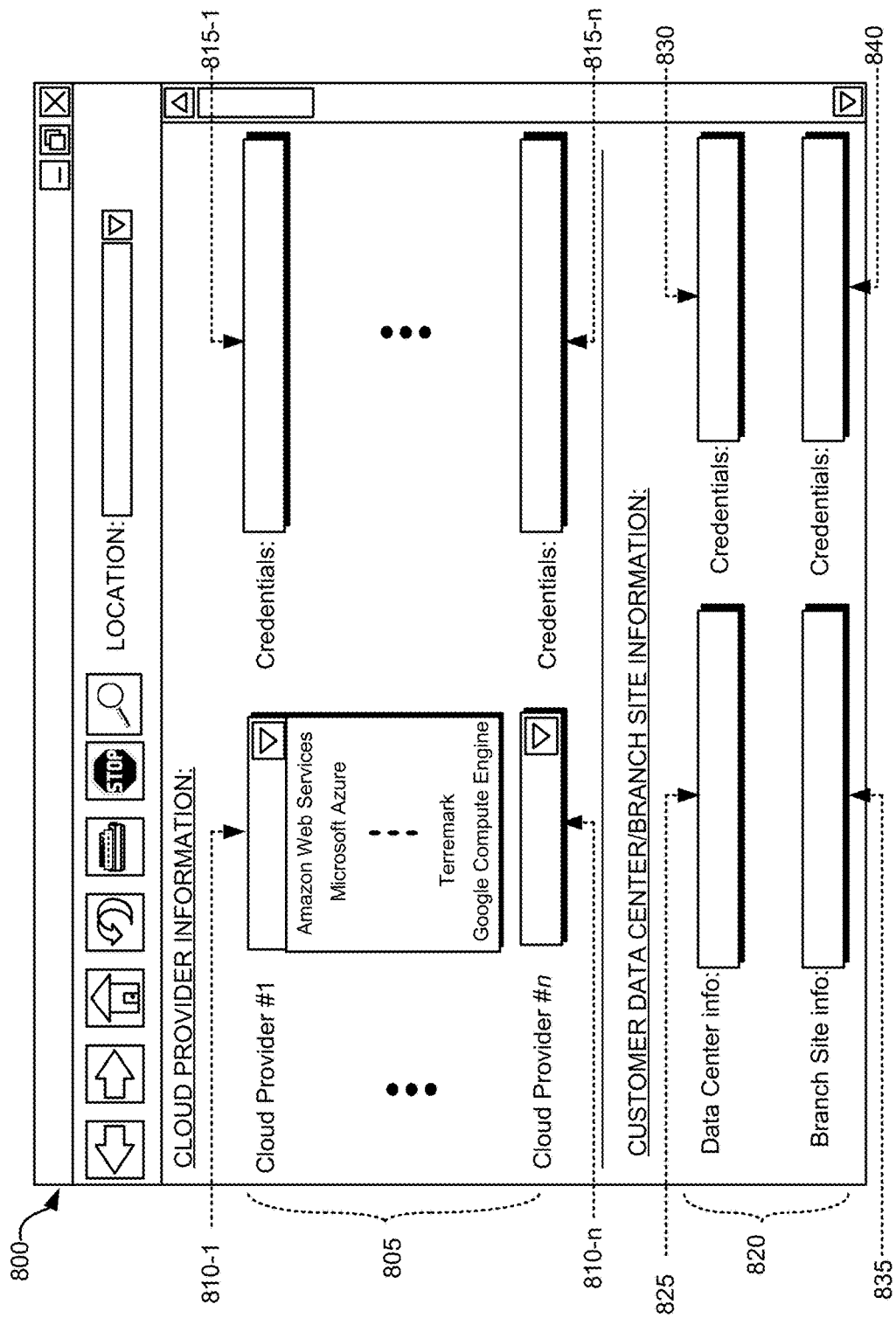
FIG. 8 is an exemplary user interface associated with providing a customer's cloud provider credential information during the exemplary process of FIGS. 7A and 7B.

FIG. 8 depicts an exemplary user interface 800 that enables customer 140 to provide the customer's cloud provider credentials. As shown, user interface 800 may include a cloud provider credentials section 805, which includes cloud provider selection menus 810-through 810-n, with associated cloud provider credentials entry boxes 815-1 through 815-n. Customer 140 may select, from a menu 810, a particular cloud provider and provide, via a corresponding entry box 815, customer 140's credentials for that cloud provider. User interface 800 may further include a data center/branch site section 820, which includes a data center information entry box 825, and a corresponding data center credentials entry box 830. Customer 140 may enter information associated with customer 140's data center(s) including, for example, a network address of the data center(s), in entry box 825, and may enter log-in credentials for the data center(s) in entry box 830. Data center/branch site section 820 additionally includes a branch site information box 835, and a corresponding branch site credentials entry box 840. Customer 140 may enter information associated with customer 140's branch site(s) including, for example, a network address of the branch site(s), in entry box 835, and may enter log-in credentials for the branch site(s) in entry box 840.

Orchestration engine 110 obtains, and uses, the customer's cloud provider credentials to obtain information regarding the customer's cloud resources at each cloud computing network 105 (block 705). Orchestration engine 110, either alone or in conjunction with a cloud management portal (e.g., CLIQR, VMTurbo), uses the customer's cloud provider credentials to log-in to customer 140's cloud provider account and extract information regarding the cloud resources of the cloud computing network 105 allocated to customer 140. Such information may include, for example, subnets and/or IP addresses associated with each cloud resource allocated to customer 140 (i.e., the cloud provider account holder) within the cloud provider's cloud computing network 105.

Orchestration engine 110 uses the customer's cloud computing network resources information to construct a map of the customer's cloud resources at each cloud computing network 105 (block 710). Orchestration engine 110 uses the subnet and IP address information, associated with customer 140's cloud resources allocated in each cloud computing network 105, possibly in conjunction with known network topology information of private IP network 135 and/or public network 130, to construct a network map of customer 140's cloud resources.

In one embodiment, orchestration engine 110 spins up (e.g., installs, starts and/or runs) a virtual router in the customer's cloud resources at each cloud computing network 105 (block 715). Referring back to FIG. 4, if customer 140 has accounts with each of cloud providers #1-n, orchestration engine 110 spins up a virtual router 400-1 in the customer's cloud resources in cloud computing network 105-1, spins up a virtual router 400-2 in the customer's cloud resources in cloud computing network 105-2, spins up a virtual router 400-3 in the customer's cloud resources in cloud computing network 105-3, and spins up a virtual router 400-n in the customer's cloud resources in cloud computing network 105-n. Spinning up the virtual routers includes installing virtual router software in a virtual machine allocated to customer 140 in cloud computing network 105. Orchestration engine 110 may identify a virtual machine into which to install the virtual router software based on the constructed network map of the customer's cloud resources of block 710.

Orchestration engine 110 defines WAN routes based on the map of the customer's cloud resources and based on network maps of the interconnecting private IP network 135 and/or public network(s) 130 (block 720). Orchestration engine 110 may define WAN routes using any type of existing routing algorithm such as, for example, link-state algorithms or distance vector algorithms. The routing algorithm determines a best path from a component of a customer's cloud resources in a cloud computing network 105 through the virtual router 400, across public network(s) 130 and/or private IP network 135 to another component (e.g., a virtual machine) of the customer's cloud resources in a different cloud computing network 105. The routing algorithm may also determine a best path from data center(s) 115 or branch site(s) 120 to a component (e.g., cloud storage) of the customer's cloud resources in a cloud computing network 105. As one specific example, orchestration engine 110 may define a WAN route from a virtual machine 235 in cloud computing network 105-2, through VR 400-2 across public network(s) 130 and private IP network 135, through VR 400-3, to a virtual machine 235 or cloud storage 230 in cloud computing network 105-3. As another specific example, orchestration engine 110 may define another WAN route from branch site(s) 120 across public network(s) 130 and/or private IP network 135, through VR 400-1, to a virtual machine 235 or cloud storage 230 in cloud computing network 105-1.

Orchestration engine 110, based on the defined WAN routes, establishes encrypted tunnels, across the private network 135 and/or the public network(s) 130, between the customer's cloud resources at each cloud computing network 105 (block 725). Orchestration engine 110 may establish an encrypted tunnel at each virtual router 400 at each cloud computing network 105. Each encrypted tunnel may include, for example, a Virtual Private Network (VPN) tunnel or an Internet Protocol Security (IPsec) tunnel. Orchestration engine 110 may, for example, use Point-to-Point Tunneling Protocol (PPTP), Layer 2 Tunneling Protocol (L2TP), Internet Protocol Security (IPsec), or Secure Sockets Layer (SSL) for establishing an encrypted tunnel across the private network 135 and/or public network(s) 130 via one of the defined WAN routes.

Figure 9:
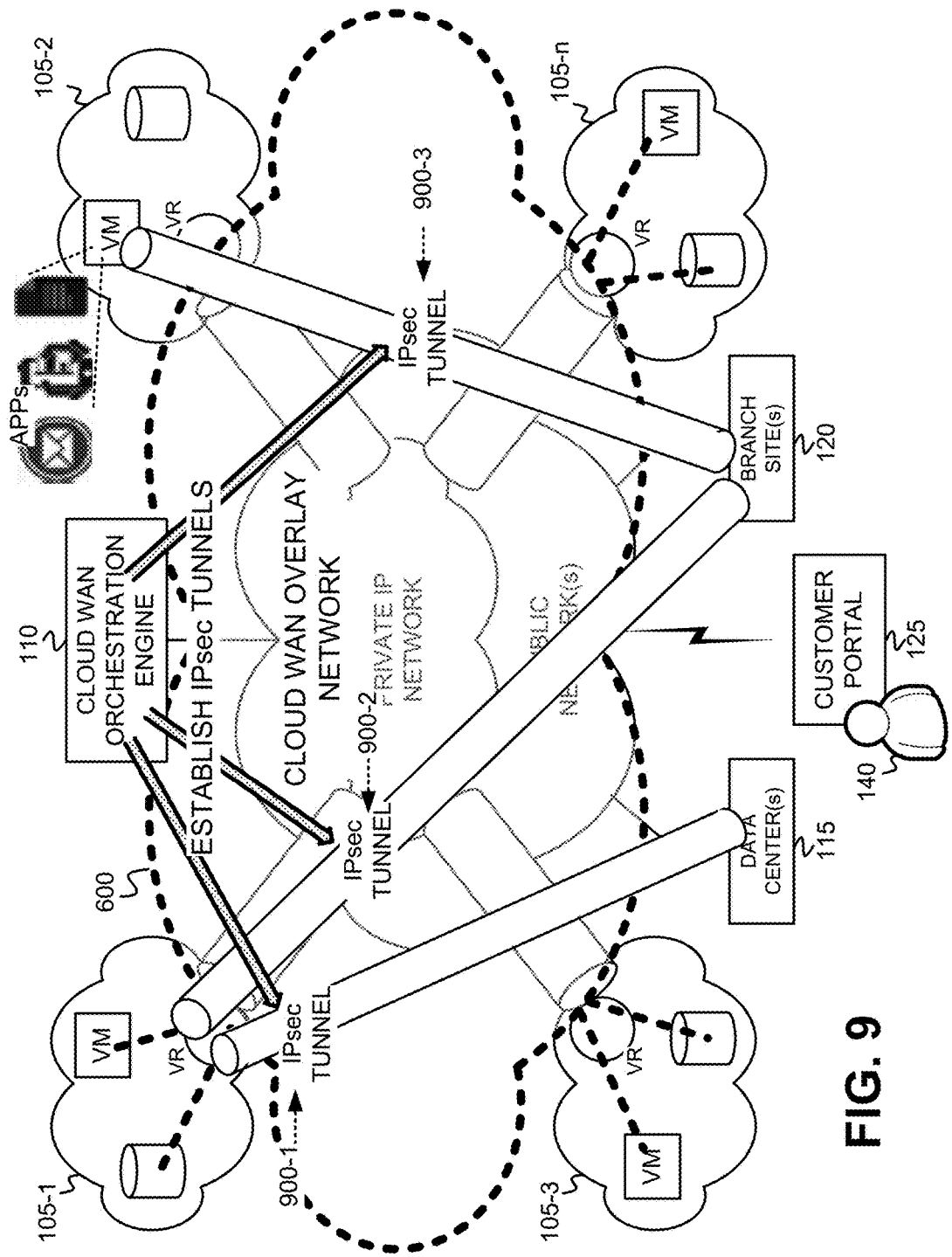
FIG. 9 illustrates examples of the cloud WAN orchestration engine establishing encrypted tunnels over the cloud WAN overlay network during the exemplary process of FIGS. 7A and 7B.

In one embodiment, orchestration engine 110 establishes encrypted tunnels between each customer data center(s) 115 and/or branch site(s) 120 and the customer's cloud resources at each cloud computing network 105 (block 730). Each encrypted tunnel may include, for example, a Virtual Private Network (VPN) tunnel or an IPsec tunnel. Orchestration engine 110 may, for example, use Point-to-Point Tunneling Protocol (PPTP), Layer 2 Tunneling Protocol (L2TP), Internet Protocol Security (IPsec), or Secure Sockets Layer (SSL) for establishing an encrypted tunnel across the private network 135 and/or public network(s) 130 via one of the defined WAN routes. Orchestration engine 110, using the defined WAN routes, may establish, for example, a respective IPsec tunnel between each data center(s) 115 of customer 140 and each cloud computing network 105 of which customer 140 is a subscriber. Orchestration engine 110, using the defined WAN routes, may also establish, for example, a respective IPsec tunnel between each branch site(s) 120 of customer 140 and each cloud computing network 105 of which customer 140 is a subscriber. FIG. 9 illustrates examples of orchestration engine 110 establishing IPsec tunnels over cloud WAN overlay network 600. As shown in the example of FIG. 9, orchestration engine 110 establishes an IPsec tunnel 900-1 between cloud computing network 105-1 and data center(s) 115 across cloud WAN overlay network 600. As further shown in the example of FIG. 9, orchestration engine 110 establishes an IPsec tunnel 900-2 between cloud computing network 105-1 and branch site(s) 120, and establishes an IPsec tunnel 900-3 between cloud computing network 105-2 and branch site(s) 120. As depicted in the example of FIG. 9, devices (not shown)

located at branch site(s) 120 may interact, via IPsec tunnel 900-3, with apps executing at a virtual machine in customer 140's cloud resources in cloud computing network 105-2.

Though not shown in FIG. 9, orchestration engine 110 may similarly establish an IPsec tunnel between data center(s) 115 and cloud computing network 105-3, between data center(s) 115 and cloud computing network 105-2, and between data center(s) 115 and cloud computing network 105-*n*. Additionally, though not shown in FIG. 9, orchestration engine 110 may similarly establish an IPsec tunnel between branch site(s) 120 and cloud computing network 105-3, and between branch site(s) 120 and cloud computing network 105-*n*.

In one embodiment, orchestration engine 110, based on the defined routes and the established encrypted tunnels, further establishes forwarding tables in the virtual routers (block 735). Based on the defined WAN routes (e.g., best paths from a source to a destination across the cloud WAN overlay network 600), orchestration engine 110 may determine, for example, a next hop from a given source node towards a given destination node along a defined WAN route through cloud WAN overlay network 600. For example, referring to FIGS. 4-6, orchestration engine 110 may determine a next hop for a virtual machine 235 in cloud computing network 105-2 to send a data unit (e.g., a packet, or other type of encapsulated data) across cloud WAN overlay network 600 to destination cloud storage 230 in cloud computing network 105-3. Orchestration engine 110 may store an IP address associated with the destination cloud storage 230 in cloud computing network 105-3 in a forwarding table in association with the IP address of the next hop node in cloud WAN overlay network 600.

Figure 10:
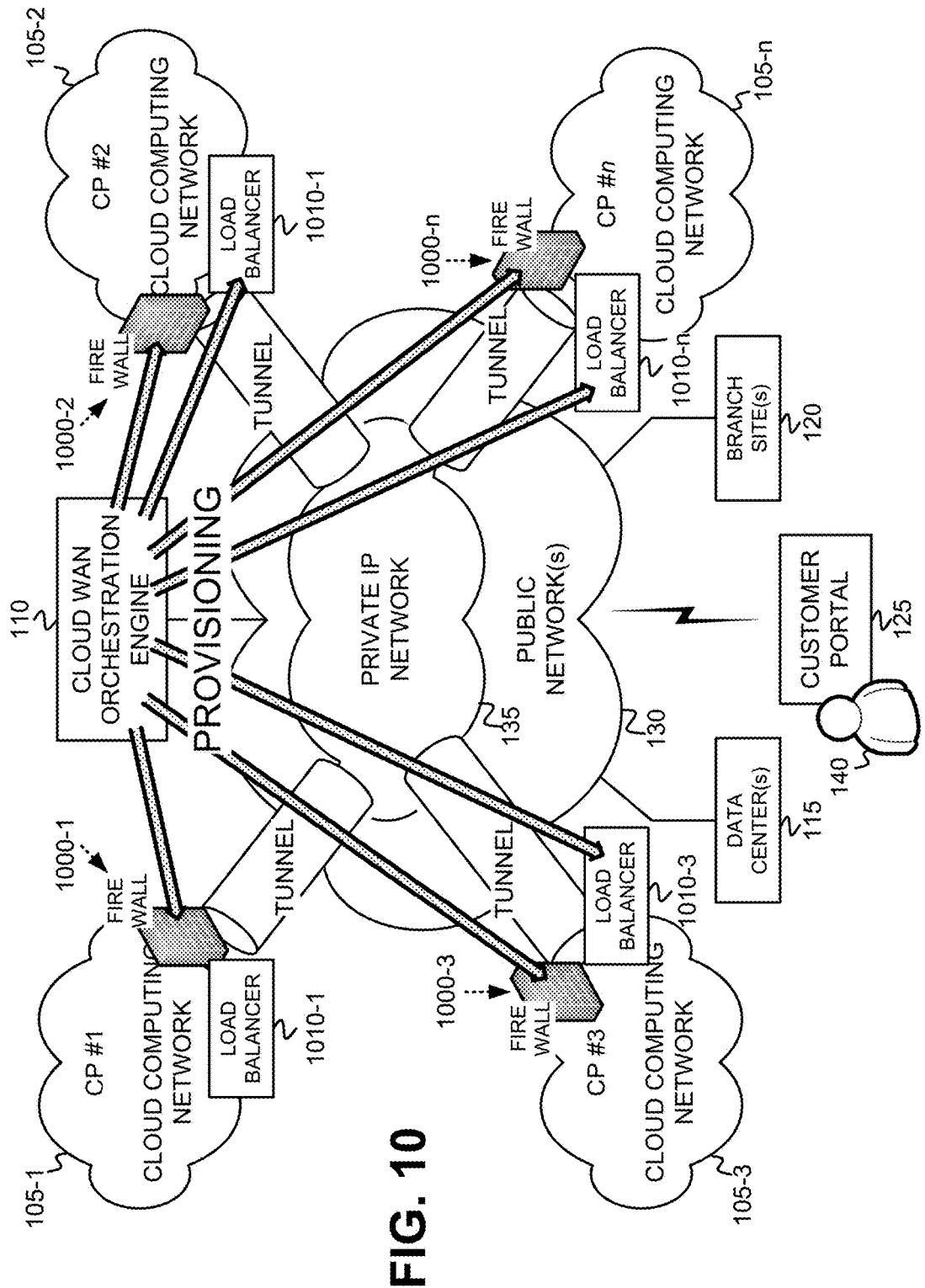
FIG. 10 depicts an example of the cloud WAN orchestration engine spinning up and provisioning firewalls and load balancers at a customer's cloud resources in multiple different cloud computing network.
Figure 11:
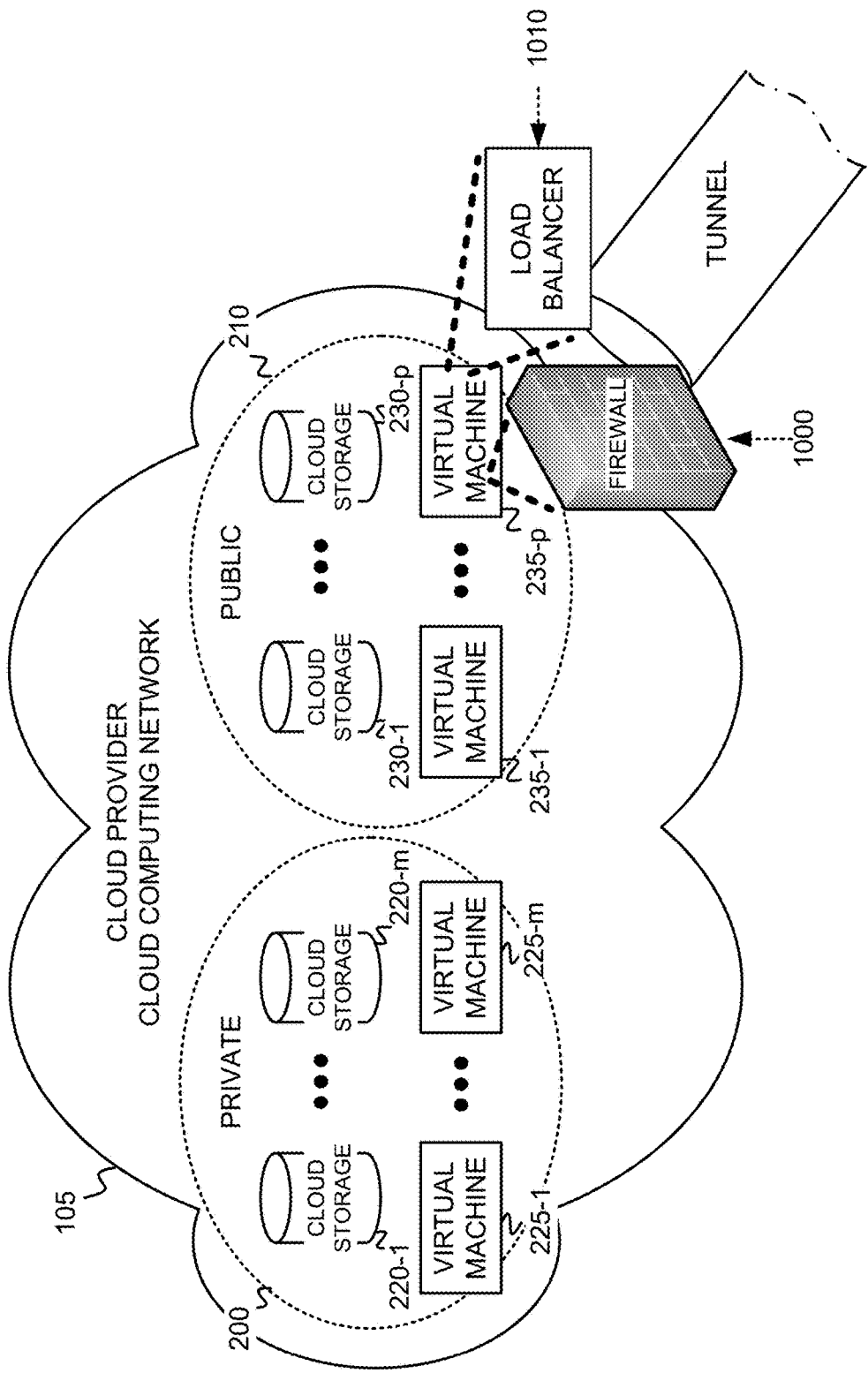
FIG. 11 depicts an example of the cloud WAN orchestration engine spinning up and provisioning a firewall and a load balancer at a virtual machine in the customer's cloud resources of a cloud computing network.

In one embodiment, orchestration engine 110 spins up a firewall at the customer's cloud resources in each cloud computing network 105 (block 740). Orchestration engine 110, using the customer cloud computing network resources information obtained in block 710, installs software that implements a firewall in a virtual machine 235 in each cloud computing network 105 of a cloud provider to which customer 140 subscribes. In addition to installation of each firewall, orchestration engine 110, as part of the provisioning, may configure each firewall, including, for example, establishing security rules for controlling the data traffic in and out of the respective cloud computing network 105. As shown in the example of FIG. 10, orchestration engine 110 may provision a firewall 1000-1 at cloud computing network 105-1, a firewall 1000-2 at cloud computing network 105-2, a firewall 1000-3 at cloud computing network 105-3, and a firewall 1000-*n* at cloud computing network 105-*n*. FIG. 11 further depicts a firewall 1000 being installed in virtual machine 235-*p* of customer 140's allocated cloud resources in cloud computing network 105. Other embodiments may not include a firewall at the customer's cloud resources, or may include a firewall by nature of network address translation (NAT) tables as part of a virtual router.

Though not shown in FIG. 10, orchestration engine 110 may install each firewall in a same virtual machine as in which a virtual router 400 was previously installed (i.e., block 715), or in a different virtual machine. Incoming data traffic from the cloud WAN overlay network may be first received and processed by the firewall 1000 before being passed to the virtual router 400 for forwarding to the destination (e.g., cloud storage 230 or virtual machine 235) in cloud computing network 105.

Orchestration engine 110 spins up a load balancer at the customer's cloud resources in each cloud computing network 105 (block 745). Orchestration engine 110, using the customer cloud computing network resources information obtained in block 710, installs software that implements a load balancer in a virtual machine 235 in each cloud computing network 105 of a cloud provider to which customer 140 subscribes. As shown in the example of FIG. 10, orchestration engine 110 may provision a load balancer 1010-1 at cloud computing network 105-1, a load balancer 1010-2 at cloud computing network 105-3, a load balancer 1010-3 at cloud computing network 105-3, and a load balancer 1010-*n* at cloud computing network 105-*n*. Though not shown in FIG. 10, orchestration engine 110 may install each load balancer 1010 in a same virtual machine as in which a virtual router 400 and/or firewall 1000 was previously installed (blocks 715 and 740), or in a different virtual machine. Orchestration engine 110 may coordinate the actions of load balancers 1010-1 through 1010-*n* to control the processing load among the different cloud computer networks 105-1 through 105-*n* of cloud providers of which customer 140 is a subscriber, as described in further detail below with respect to the exemplary process of FIG. 12. FIG. 11 depicts a load balancer 1010 being installed in virtual machine 235-*p* of customer 140's allocated cloud resources in cloud computing network 105. Other embodiments may not include a load balancer at the customer's cloud resources.

Figure 12:
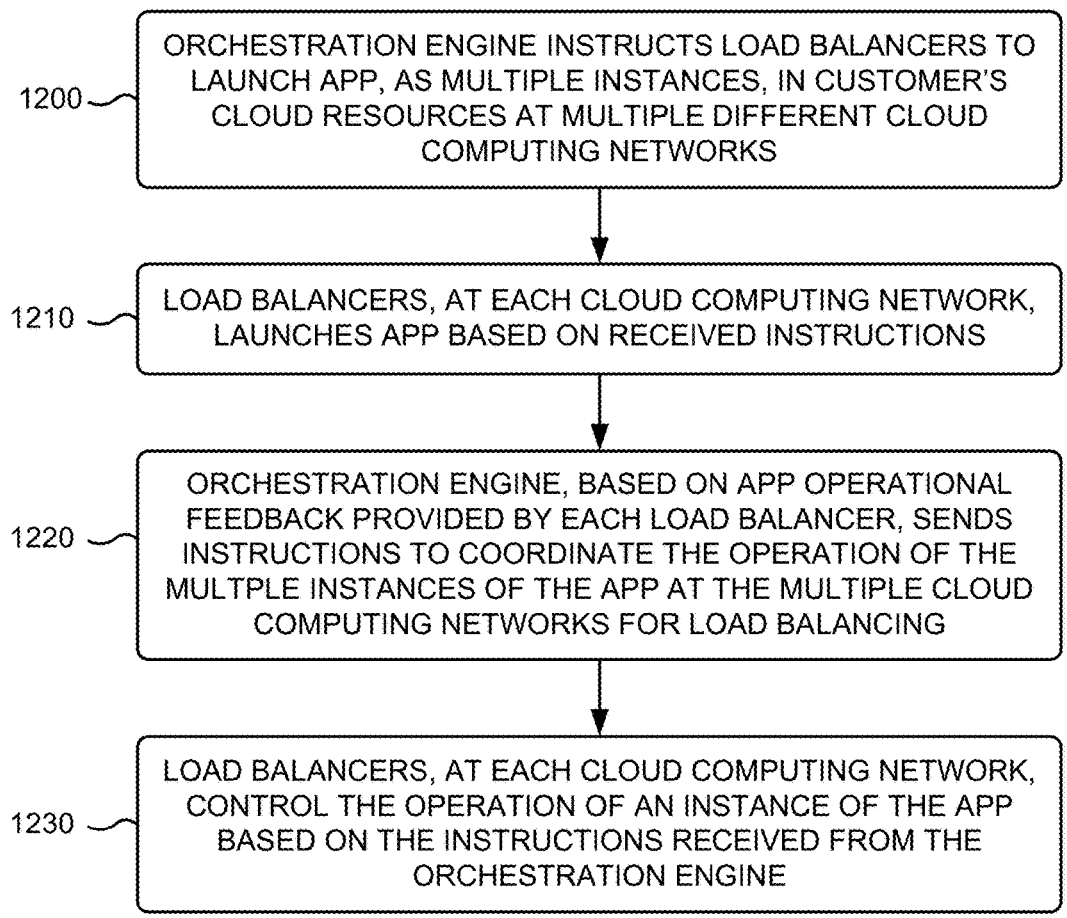
FIG. 12 is a flow diagram that illustrates an exemplary process for launching multiple instances of an application across the cloud WAN overlay network at multiple cloud providers and performing load balancing of the multiple instances of the application.

FIG. 12 is a flow diagram that illustrates an exemplary process for launching multiple instances of an application across the cloud WAN overlay network 600 at multiple cloud providers, and performing load balancing of the multiple instances of the application. The exemplary process of FIG. 12 may be implemented by orchestration engine 110, in conjunction with load balancers 1010-1 through 1010-*n* previously spun up in each cloud computing network 105. The exemplary process of FIG. 12 is described below with reference to the diagrams of FIGS. 13 and 14.

Figure 13:
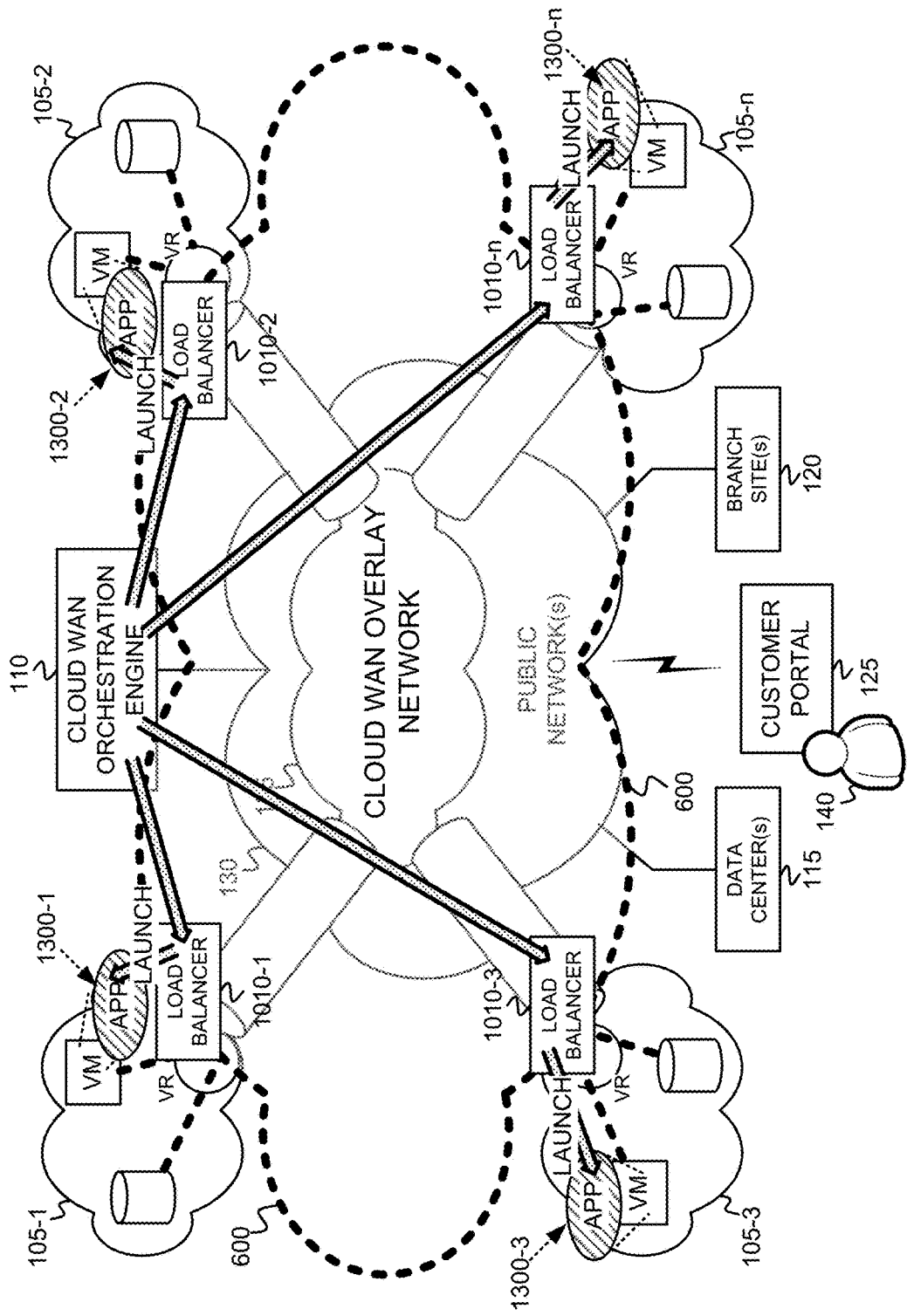
FIGS. 13 and 14 depict examples associated with the exemplary process of FIG. 12 involving the cloud WAN orchestration engine launching an app at multiple different cloud computing networks, and the cloud WAN orchestration engine coordinating the load balancing of the apps.

The exemplary process may include orchestration engine 110 instructing load balancers 1010 to launch an app, as multiple instances, in customer 140's cloud resources at multiple different cloud computing networks (block 1200). Orchestration engine 110 determines how many different cloud providers of which customer 140 is a subscriber, and then selects the associated cloud computing networks 105 in which a particular app will be launched for execution. Orchestration engine 110 sends instructions, via cloud WAN overlay network 600, to a respective load balancer 1010 associated with each selected cloud computing network 105. FIG. 13 depicts an example in which orchestration engine 110 selects all of cloud computing networks 105-1 through 105-*n* for load balancing. In this example, orchestration engine 110 sends instructions to load balancers 1010-1 through 1010-*n* with instructions to launch a particular app within a virtual machine 235 of customer 140's cloud resources.

Load balancers 1010, at each of the cloud computing networks 105, launches the app based on the received instructions (block 1210). Upon receipt of the instructions from orchestration engine 110, each load balancer 1010 may immediately launch the instance of the app within customer 140's cloud resources in the respective cloud computing network 105. Alternatively, the instructions from orchestration engine 110 may specify a timetable that specifies a particular time at which each load balancer 1010 is to launch the instance of the app within customer 140's cloud resources. In the example of FIG. 13, load balancer 1010-1, based on instructions received from orchestration engine 110 launches an instance of app 1300-1 in cloud computing network 105-1; load balancer 1010-2, based on instructions received from orchestration engine 110 launches another instance of app 1300-2 in cloud computing network 105-2; load balancer 1010-3, based on the instructions received from orchestration engine 110 launches a further instance of app 1300-3 in cloud computing network 105-3; and load balancer 1010-n, based on the instructions received from orchestration engine 110, launches yet another instance of app 1300-4 in cloud computing network 105-n.

Figure 14:
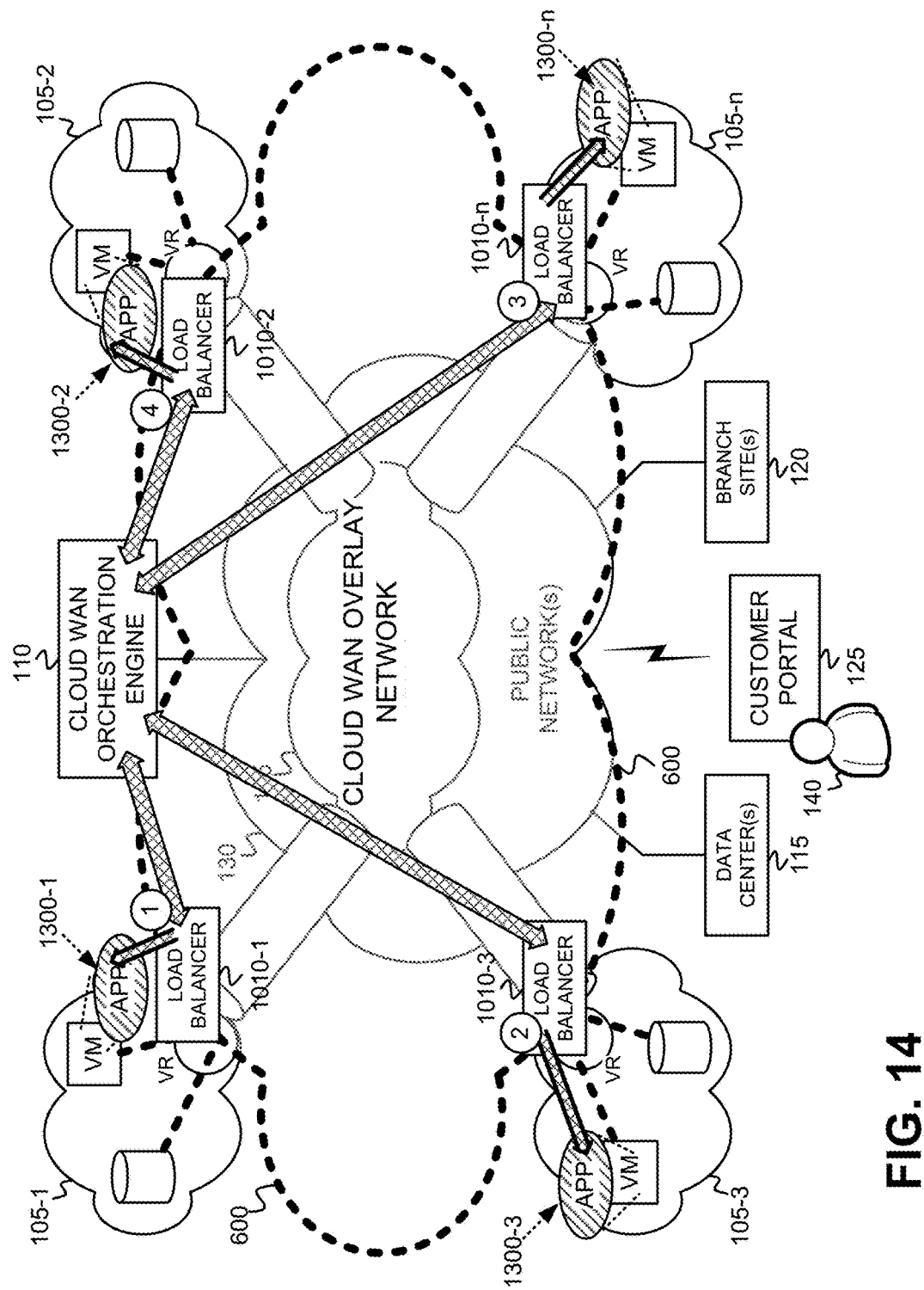

Orchestration engine 110, based on app operational feedback provided by each load balancer 1010, sends instructions to coordinate the operation of the multiple instances of the app at the multiple cloud computing networks for load balancing (block 1220). Orchestration engine 110 maintains a "global" view of the operation of each of the instances of the app executing at each of the selected cloud computing networks 105, and sends load balancing instructions, accordingly, to coordinate the operations of each of the apps via control by the load balancers. Load balancers 1010, at each cloud computing network 105, control the operation of an instance of the app based on the instructions received from the orchestration engine 110 (block 1230). FIG. 14 depicts an example in which orchestration receives operational feedback from each of load balancers 1010-1 through 1010-n, and sends corresponding instructions to control load balancing via each of load balancers 1010-1 through 1010-n. For example, load balancer 1010-1 may suspend execution of app 1300-1 to reduce the processing load at a virtual machine 235 of cloud computing network 105-1, while instructing load balancer 1010-n to execute a previously installed instance of app 1300-n thereby increasing the processing load at a virtual machine 235 of cloud computing network 105-n. In addition to suspending or initiating operations of particular apps at the different cloud computing networks, orchestration engine 110 may additionally, or alternatively, control the tempo of operations performed by each app at the different cloud computing networks. For example, orchestration engine 110 may control a pace at which tasks are input to an executing app at each cloud computing network 105, thereby, reducing or increasing processing load at the virtual machine executing the app. The load balancing performed by orchestration engine 110, in conjunction with load balancers 1010-1 through 1010-n, may additionally include balancing network traffic load. For example, the load balancing may additionally take into account a volume of traffic sent to and from each executing app across cloud WAN overlay network 600, and may balance the load at each cloud computing network 105 based on a desired data traffic volume to or from each cloud computing network 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7A, 7B and 12, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
providing, by a network device and to a device associated with a customer, an interface, wherein the interface includes a plurality of cloud provider selection menus and, for each cloud provider selection menu, a corresponding credential entry box, wherein each cloud provider selection menu lists a plurality of cloud providers, and wherein the interface allows the customer to input multiple different cloud providers for which the customer is a subscriber and, for each of the multiple different cloud providers, credentials of the customer;
obtaining, by the network device and for each of the multiple different cloud providers for which the customer is a subscriber, the credentials of the customer; and
establishing, by the network device using the credentials of the customer, a cloud wide area network (WAN) overlay network across multiple different cloud computing networks associated with the multiple different cloud providers.

2. The method of claim 1, further comprising:
using, by the network device, the credentials of the customer to obtain information regarding cloud resources of the customer at each of the multiple different cloud computing networks.

3. The method of claim 2, further comprising:
using, by the network device, the obtained information regarding the cloud resources of the customer to construct a map of the cloud resources of the customer at each of the multiple different cloud computing networks.

4. The method of claim 3, wherein establishing the cloud WAN overlay network comprises:
spinning up, by the network device, multiple virtual routers in the cloud resources of the customer at each of the multiple different cloud computing networks, with a different one of the multiple virtual routers being spun up in each of the multiple different cloud computing networks, wherein each of the multiple different cloud computing networks is associated with a different one of the multiple different cloud providers,
wherein the multiple virtual routers route data traffic between the different cloud computing networks via the cloud WAN overlay network.

5. The method of claim 4, wherein establishing the cloud WAN overlay network comprises:
defining WAN routes based on the constructed map of the cloud resources of the customer at each of the multiple different cloud computing networks; and
establishing encrypted tunnels between the cloud resources of the customer at each of the multiple different cloud computing networks.

6. The method of claim 5, wherein the encrypted tunnels comprise Virtual Private Network (VPN) tunnels, or Internet Protocol Security (IPsec) tunnels.

7. The method of claim 4, wherein establishing the cloud WAN overlay network comprises:
   defining WAN routes based on the constructed map of the cloud resources of the customer at each of the multiple different cloud computing networks; and
   establishing encrypted tunnels between the cloud resources of the customer at each of the multiple different cloud computing networks and one or more data centers or one or more branch sites.

8. The method of claim 1, wherein establishing the cloud WAN overlay network comprises:
   spinning up, by the network device, multiple virtual routers in cloud resources allocated to the customer at each of the multiple different cloud computing networks, with a different one of the multiple virtual routers being spun up in each of the multiple different cloud computing networks, wherein each of the multiple different cloud computing networks is associated with a different one of the multiple different cloud providers,
   wherein the multiple virtual routers route data traffic between the different cloud computing networks via the cloud WAN overlay network.

9. The method of claim 8, wherein establishing the cloud WAN overlay network comprises:
   defining WAN routes based on a map of the cloud resources of the customer at each of the multiple different cloud computing networks; and
   establishing, based on the defined WAN routes, forwarding tables in each of the multiple virtual routers for forwarding data traffic to and from the multiple different cloud computing networks via the cloud WAN overlay network.

10. The method of claim 8, further comprising:
    spinning up, by the network device, multiple different firewalls, in association with the multiple virtual routers, in the cloud resources of the customer at each of the multiple different cloud computing networks, with a different one of the multiple different firewalls being spun up in each of the multiple different cloud computing networks.

11. The method of claim 1, further comprising:
    spinning up, by the network device, multiple different load balancers in cloud resources of the customer at each of the multiple different cloud computing networks, with a different one of the multiple different load balancers being spun up in each of the multiple different cloud computing networks.

12. A network device, comprising:
    a communication interface configured to connect to a network; and
    a processing unit configured to:
       provide, to a device associated with a customer, an interface, wherein the interface includes a plurality of cloud provider selection menus and, for each cloud provider selection menu, a corresponding credential entry box, wherein each cloud provider selection menu lists a plurality of cloud providers, and wherein the interface allows the customer to input multiple different cloud providers for which the customer is a subscriber and, for each of the multiple different cloud providers, credentials of the customer;
       obtain the credentials of the customer associated with each of the multiple different cloud providers, and
       establish, using the credentials of the customer, a cloud wide area network (WAN) overlay network across multiple different cloud computing networks associated with the multiple different cloud providers.

13. The network device of claim 12, wherein, when establishing the cloud WAN overlay network, the processing unit is further configured to:
    spin up multiple virtual routers in cloud resources of the customer at each of the multiple different cloud computing networks, with a different one of the multiple virtual routers being spun up in each of the multiple different cloud computing networks, wherein each of the multiple different cloud computing networks is associated with a different one of the multiple different cloud providers,
    wherein the multiple virtual routers route data traffic between the different cloud computing networks via the cloud WAN overlay network.

14. The network device of claim 12, wherein the processing unit is further configured to:
    use the credentials of the customer to obtain information regarding cloud resources of the customer at each of the multiple different cloud computing networks, and
    use the obtained information regarding the cloud resources of the customer to construct a map of the cloud resources of the customer at each of the multiple different cloud computing networks,
    wherein, when establishing the cloud WAN overlay network, the processing unit is further configured to:
       define WAN routes based on the constructed map of the cloud resources of the customer at each of the multiple different cloud computing networks, and
       establish encrypted tunnels between the cloud resources of the customer at each of the multiple different cloud computing networks.

15. The network device of claim 14, wherein the encrypted tunnels comprise Virtual Private Network (VPN) tunnels, or Internet Protocol Security (IPsec) tunnels.

16. The network device of claim 14, wherein, when establishing the cloud WAN overlay network, the processing unit is further configured to:
    establish encrypted tunnels between the cloud resources of the customer at each of the multiple different cloud computing networks and one or more data centers or one or more branch sites.

17. The network device of claim 13, wherein when establishing the cloud WAN overlay network, the processing unit is configured to:
    use the credentials of the customer to obtain information regarding cloud resources of the customer at each of the multiple different cloud computing networks,
    use the obtained information regarding the cloud resources of the customer to construct a map of the cloud resources of the customer at each of the multiple different cloud computing networks,
    define WAN routes based on the constructed map of the cloud resources of the customer at each of the multiple different cloud computing networks; and
    establish, based on the defined WAN routes, forwarding tables in each of the multiple virtual routers for forwarding data traffic to and from the different cloud computing networks via the cloud WAN overlay network.

18. The network device of claim 13, wherein the processing unit is further configured to:

spin up multiple different firewalls, in association with the multiple virtual routers, in cloud resources of the customer at each of the multiple different cloud computing networks, with a different one of the multiple different firewalls being spun up in each of the multiple different cloud computing networks.

19. The network device of claim 12, wherein the processing unit is further configured to:
spin up multiple different load balancers in cloud resources of the customer at each of the multiple different cloud computing networks, with a different one of the multiple different load balancers being spun up in each of the multiple different cloud computing networks.

20. A non-transitory storage medium storing instructions executable by a computational device, wherein the instructions comprise instructions to cause the computational device to:
provide, to a device associated with a first customer, an interface, wherein the interface includes a plurality of cloud provider selection menus and, for each cloud provider selection menu, a corresponding credential entry box, wherein each cloud provider selection menu lists a plurality of cloud providers, and wherein the interface allows the first customer to input multiple different cloud providers for which the first customer is a subscriber and, for each of the multiple different cloud providers, credentials associated with the first customer;
obtain, for the first customer, first credentials associated with a first cloud provider of the multiple different cloud providers, wherein the first cloud provider is associated with a first cloud computing network;
obtain, for the first customer, second credentials associated with a second cloud provider of the multiple different cloud providers, wherein the second cloud provider is associated with a second cloud computing network;
obtain, using the first and second credentials, information regarding the first customer's cloud resources in the first cloud computing network and the second cloud computing network;
construct, using the information regarding the first customer's cloud resources, a map of the first customer's cloud resources;
cause a first virtual router to be spun up in the first customer's cloud resources in the first cloud computing network;
cause a second virtual router to be spun up in the first customer's cloud resources in the second cloud computing network;
define wide area network (WAN) routes based on the map of the first customer's cloud resources and based on a network map of a private Internet Protocol (IP) network, wherein the private IP network connects to the first customer's cloud resources; and
establish encrypted tunnels, based on the defined WAN routes, between the first customer's cloud resources across the private IP network.

* * * * *